Oct. 9, 1928.  
W. H. HAINES  
LAWN MOWER  
Filed Nov. 17, 1926  
1,687,202  
5 Sheets-Sheet 4
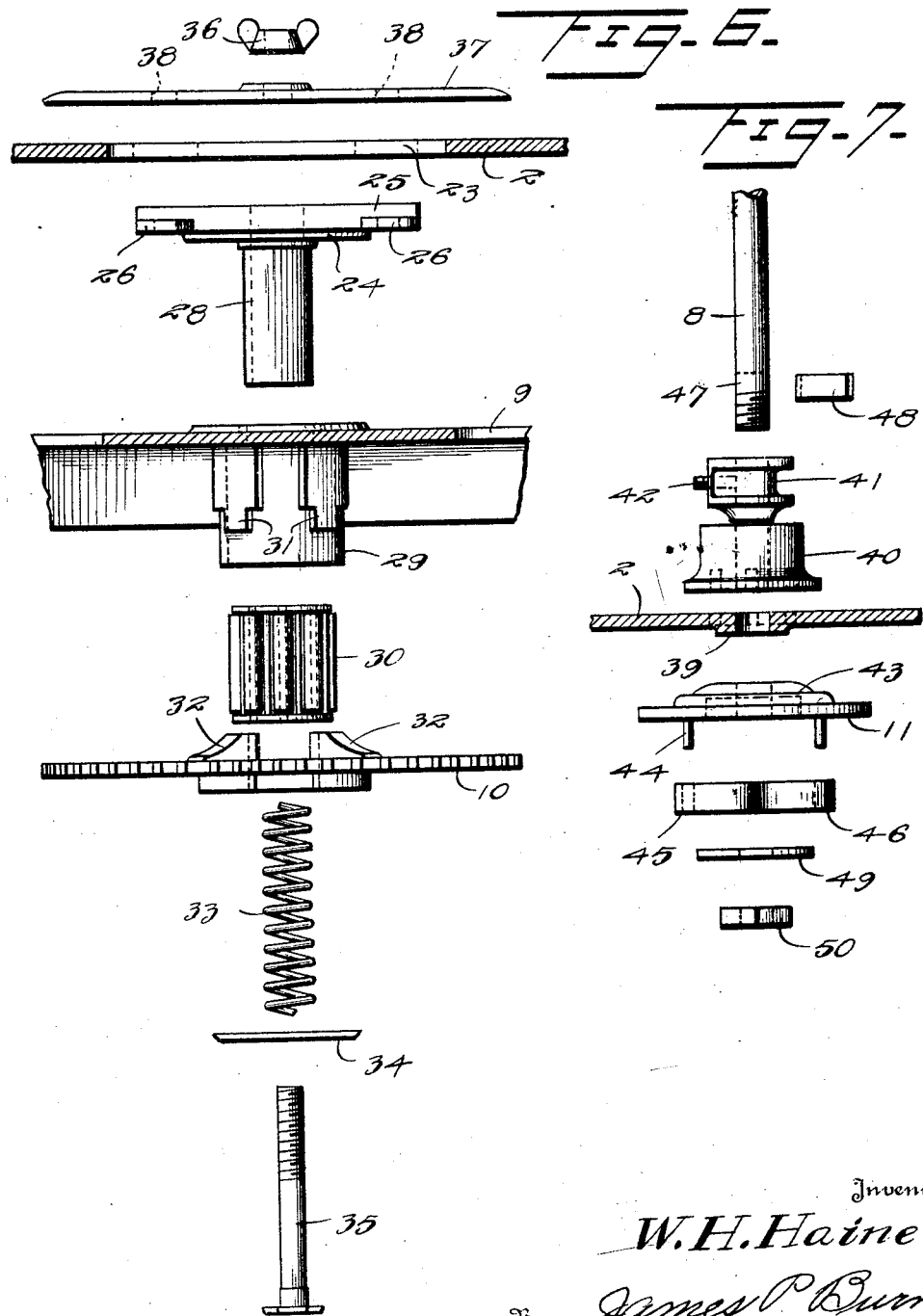

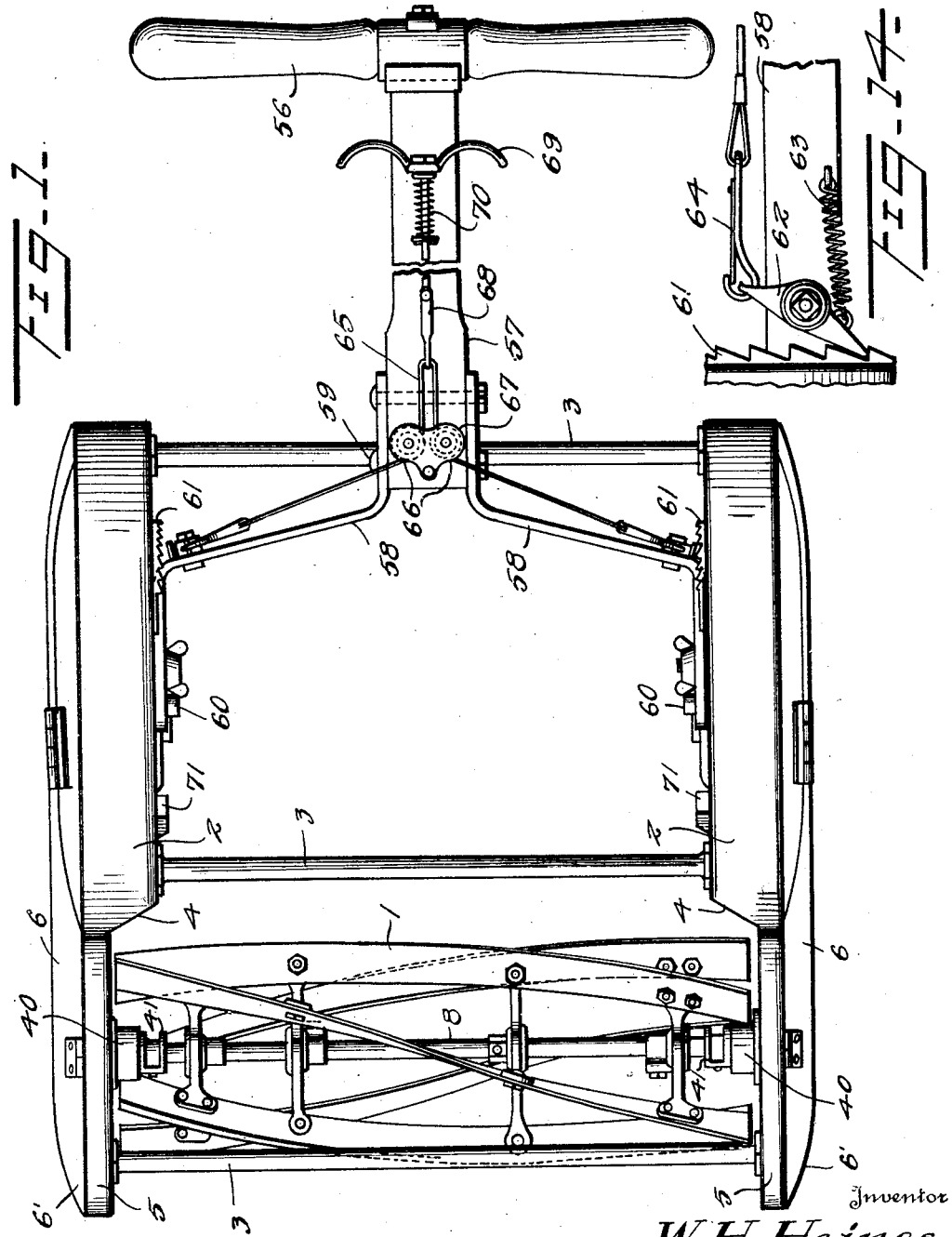

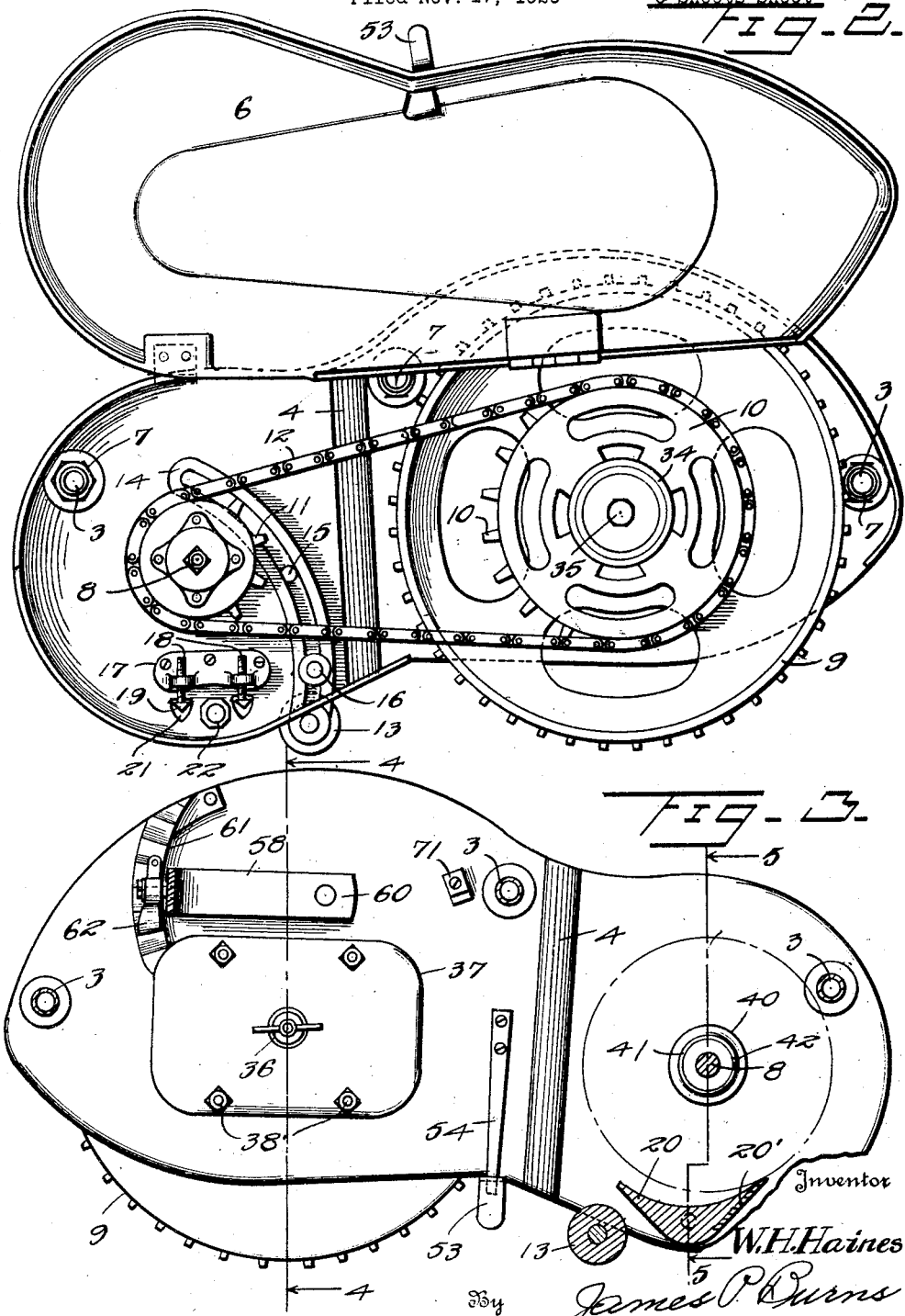

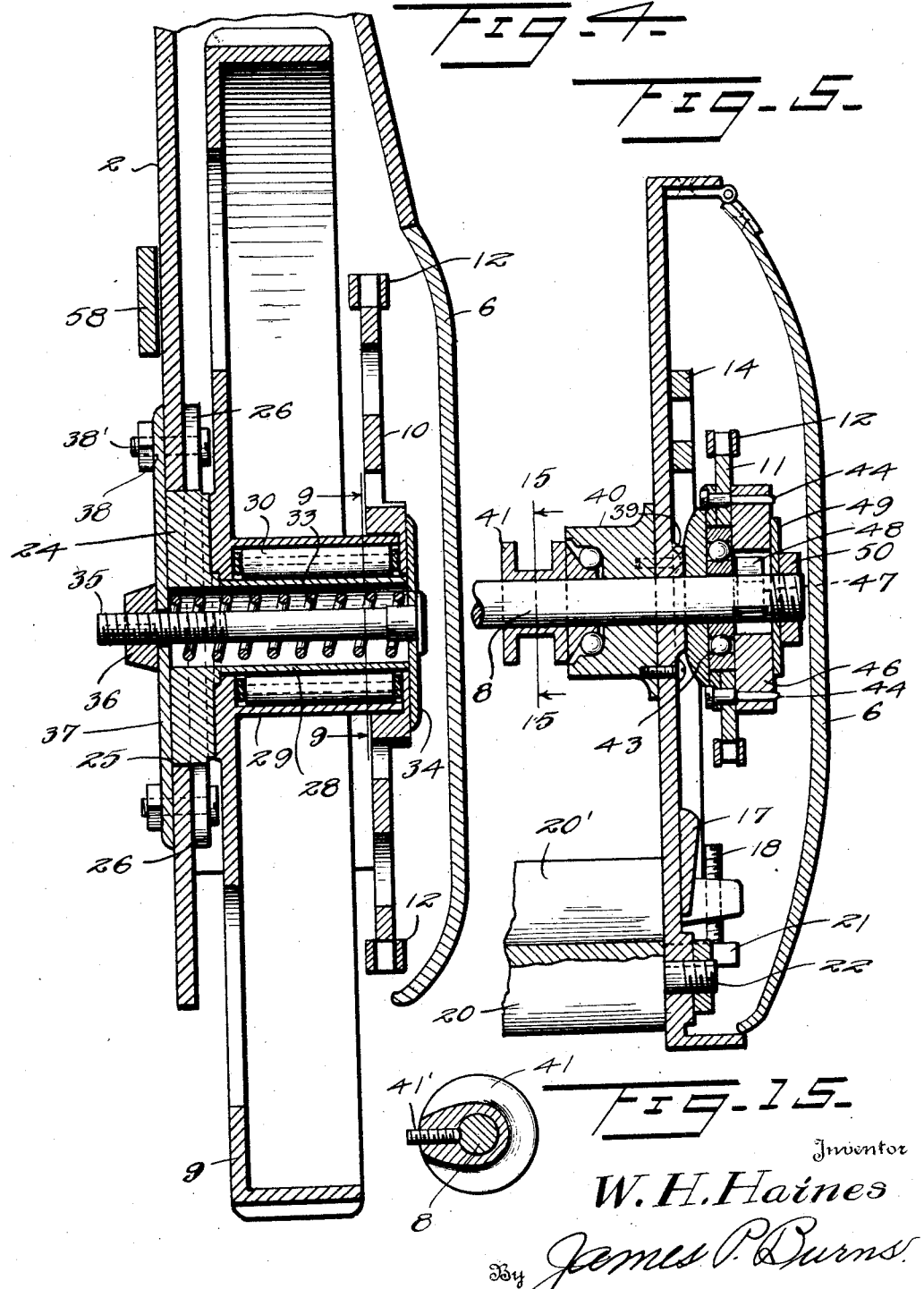

Oct. 9, 1928.
W. H. HAINES
LAWN MOWER
Filed Nov. 17, 1926   5 Sheets-Sheet 5
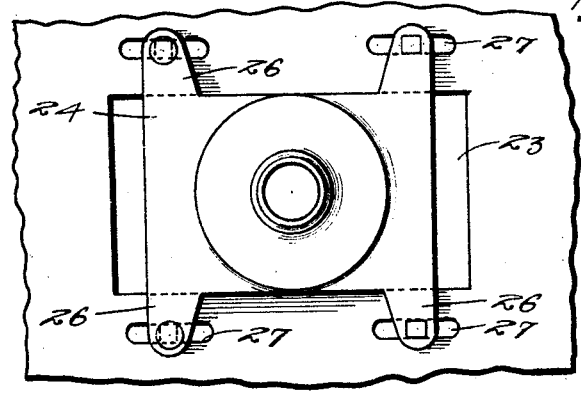
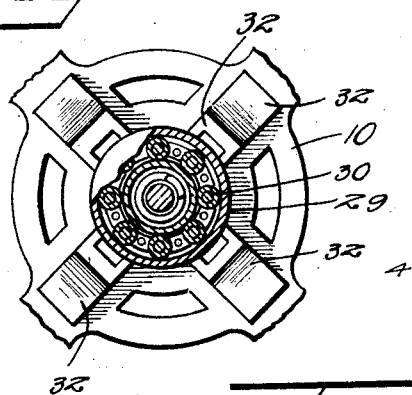
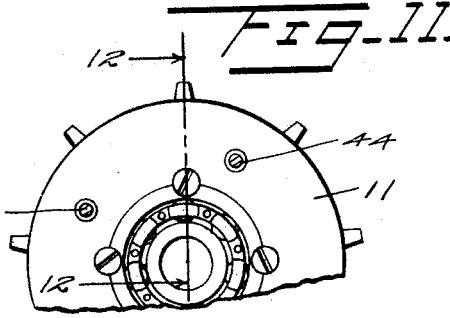
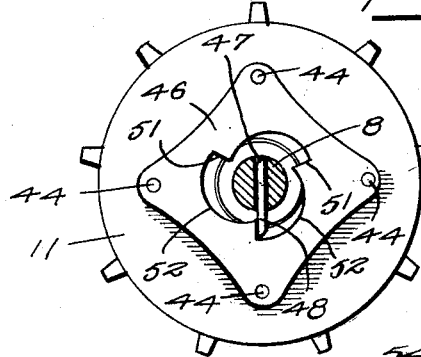
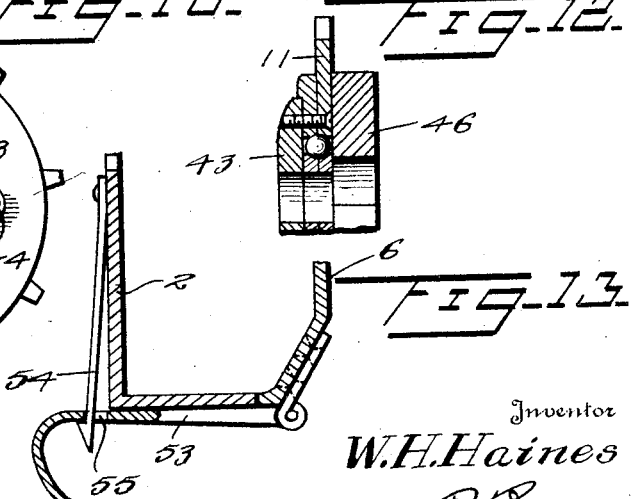
Inventor
W. H. Haines
By James P. Burns
Attorney Patented Oct. 9, 1928.

1,687,202

UNITED STATES PATENT OFFICE.

WILLIAM H. HAINES, OF THOMPSONTOWN, PENNSYLVANIA.

LAWN MOWER.

Application filed November 17, 1926. Serial No. 148,875.

My present invention relates to and has for its object the provision of a new and improved form of lawn mower of the type in which the cutter reel is positioned in advance of and driven by the ground wheels of the machine.

More specifically my invention contemplates the provision of a lawn mower in which the operating elements are completely housed in appropriate duplicate housings provided at each side of the lawn mower. While I am aware that it has heretofore been proposed to construct lawn mowers having a driven cutter reel positioned in advance of the ground wheels, so that the ground wheels never pass over uncut grass, I am not aware that any of such devices possess the novel characteristics embodied in my invention, more particularly the provision of duplicate housings which are so constructed as to completely enclose all of the driving elements of the machine while permitting the ground wheels to follow in the path of the cutter reel.

It is a further object of my invention to provide a lawn mower in which the ground wheels are adjustably supported upon stub axles independently carried by the separate housings to provide for the independent adjustment of the driving mechanism at each side of the lawn mower.

My invention further contemplates the provision of a novel arrangement for clutching the driving mechanism to the cutter reel to provide for positively driving the cutter reel forwardly when the lawn mower is being moved in an advancing direction, and which permits the cutter reel to remain stationary when the lawn mower is moved rearwardly which clutching arrangement permits a reversal of this operation for the purpose of grinding the blades of the cutter reel without necessitating any change in the driving mechanism of the lawn mower.

Other and more specific objects of the invention will be apparent from the following detailed description.

In the drawings forming a part of this application like reference characters indicate like parts.

Fig. 1 is a top plan view of a lawn mower constructed in accordance with my invention.

Fig. 2 is a view in side elevation of the lawn mower showing the closure for one of the housings in open position and illustrating the driving mechanism.

Fig. 3 is a side elevation of the housing shown in Fig. 2 and taken from the opposite or inner side thereof.

Fig. 4 is a sectional view taken on the line 4—4 of Fig. 3.

Fig. 5 is a sectional view taken on the line 5—5 of Fig. 3.

Fig. 6 is a group view showing one of the ground wheels and the associated elements which are shown in an assembled relation in Fig. 4.

Fig. 7 is a group view of the elements shown in assembled relation in Fig. 5.

Fig. 8 is a detailed view showing the adjustable mounting for a ground wheel.

Fig. 9 is a detailed view taken on the line 9—9 of Fig. 4 showing the manner in which the driving sprocket is secured to the ground wheel.

Fig. 10 is a view in side elevation showing the reversible clutching member releasably secured to the driven sprocket.

Fig. 11 is a detailed view in side elevation of the opposite side of the driven sprocket from that shown in Fig. 10 a portion of the sprocket being broken away.

Fig. 12 is a sectional view along the line 12—12 of Fig. 11.

Fig. 13 is a detailed view of the latch for the housing closure.

Fig. 14 is a detailed view of the pawl and ratchet device for securing adjustment of the lawn mower handle, and Fig. 15 is a detailed sectional view taken on the line 15—15 of Fig. 5.

The lawn mower is provided with a conventional cutter reel 1 mounted between the forward ends of and having bearings in the longitudinally extending parallel hollow housings 2. The housings 2 are held in spaced relation and braced by the transverse spacing bars 3. As an important feature of my invention, the inner walls of the housings 2 are curved outwardly to provide relatively narrow forward end portions 5 between which the cutter reel is positioned. The degree of reduction in the width of the housings between the rear portions thereof, and the relatively narrow end portions 5 is designed to provide a clearance for the ends of the cutter reel blades whereby the ground wheels supported in the relatively wide rear portions of the housings 2 may follow in the path of the cutter reel 1.

Each housing is provided with a hinged closure member 6 which terminates at its forward end in an inwardly directed curved portion 6' which is adapted to deflect objects such as shrubbery and the like encountered by the edges of the lawn mower. The closure members 6 are adapted to open upwardly and render accessible and removable from the housing all the driving mechanism housed therein as more clearly shown in Fig. 2. The spacer bars 3 extend through the inner walls of the housings and are clamped in position by the nuts 7. The shaft 8 of the cutter reel also extends through and has a bearing in the inner wall of each housing.

The driving mechanism is duplicated for each end of the cutter reel and all of the elements of the driving mechanism are reversible, that is the mechanism for driving the left-hand end of the cutter reel may by merely reversing the manner in which the same is assembled be employed for driving the right-hand end of the cutter reel. For the purposes of brevity and clearness, since the elements mounted in each housing are duplicated, only one set will be described in detail.

Referring more particularly to the structure shown in Fig. 2 the ground wheel 9 has interlocked therewith a driving sprocket wheel 10 while there is associated with the cutter reel shaft 8 a driven sprocket wheel 11. The sprocket chain 12 trained about said sprocket wheels provides for the driving of the sprocket wheel 11 from the ground wheel 9 through the sprocket wheel 10. The mechanism for clutching the driven sprocket wheel 11 to the cutter reel shaft will be later described.

The lawn mower is provided with the conventional ground roller 13 carried by the arcuate slotted supporting bar 14 adapted to be guided by the pin 15 fixed to the inner wall of the housing 2. Clamping means 16 are provided for holding the ground roller 13 in any adjusted position to thereby regulate the distance from the ground that the cutter reel may be carried. It is to be noted that this adjustment of the ground roller 13 permits of considerable variation in the cutting of the grass. Thus either very short or relatively long grass may be effectively cut.

There is also releasably secured to the inner wall of the housing 2 a bracket 17 in which the set screws 18 are mounted. These set screws bear against the projections 19 carried by the stationary cutter blade supporting member 20 which is provided at each end with a projection 22 adapted to extend through the inner wall of the housing 2 and act as a fulcrum for the supporting member 20. The projections 19 extend through the slots 21 in the inner wall of the housing 2 and are adapted to be operated upon by the set screws 18 to move the supporting member 20 about the fulcrum and thereby adjust the position of the stationary cutter blade 20' with respect to the blades of the cutter reel 1.

The manner in which the ground wheel 9 is supported from the inner wall of the housing 2 will now be described. The inner wall of the housing 2 is provided with the rectangular opening 23 as shown in Figs. 6 and 8. A rectangular block 24 is provided with a portion 25 adapted to snugly fit in the rectangular opening 23 of the inner wall of the housing 2. The block 24 is considerably shorter than the opening 23 whereby the block may be moved longitudinally of the opening. The block 24 is provided with the projecting lugs 26 each of which is provided with a square opening. These lugs are adapted to overlie the slots 27 and said square openings to register therewith as clearly shown in Fig. 8. The block 24 carries the hollow stub axle 28. The ground wheel 9 is provided with a cylindrical hub 29 as more particularly shown in Figs. 4 and 6. A roller bearing 30 is adapted to be fitted between the stub axle 28 and the hub 29. The exterior of the cylindrical hub 29 is provided with a plurality of circumferentially spaced interlocking ribs 31 which cooperate with the recessed lugs 32 carried by the driving sprocket wheel 10 whereby said sprocket wheel is locked to the hub of the ground wheel and rotates therewith. A coil spring 33 extends through the stub axle 28 and one end thereof bears against the washer 34 which is held in position by the bolt 35 and wing nut 36 which is adapted to compress the spring 33 against the plate 37. It will be seen that the spring 33 acts to maintain the members taut thus preventing undue wear and vibration. The plate 37 is sufficiently large to completely cover the opening 23 and slots 27 in the inner walls of the housing 2. This plate 37 is provided with openings 38 which also register with the square openings in the lugs 26 of the block 24. The arrangement is such that suitable clamping bolts such as shown at 38' in Fig. 4 may be inserted through and held against rotation by the square openings in the lugs 26 while the projecting ends of the bolts 38' extend through the openings 38 in the plate 37. From the foregoing it will be appreciated that when the ground wheel 9 and all of the associated elements are in assembled relation as shown in Fig. 4, the whole unit including the stub axle 28, ground wheel 9 and driving sprocket 10 may be shifted longitudinally of the housing 2 by merely releasing the four nuts on the outer ends of the bolts 38' which will permit the shifting of the block 24 in the rectangular opening 23. This provides for the independent tensioning of the sprocket chains 12 without necessitating their removal or the removal of any of the driven elements of the machine.

The bearing for the cutter reel shaft 8 and the clutching means for driving the same through the driven sprocket wheel 11 will now be described. The inner wall of the housing 2 is provided with a bushing member 39 through which the shaft 8 is adapted to extend. To one side of the inner wall of the housing 2 is releasably secured a ball-race 40. A cooperating ball-race member 41 is clamped upon the shaft 8 by the set screw 41' and functions to hold the balls in the ball-race 40 whereby a ball-bearing mounting for the cutter reel shaft 8 is obtained. The driven sprocket wheel 11 is so mounted as to be freely rotatable upon the shaft 8 and carries a ball-race 43 whereby a ball-bearing engagement is obtained between the sprocket wheel 11 and the shaft 8. The sprocket wheel 11 carries four projecting pins 44 adapted to be received within the openings 45 in the clutch block 46. The cutter reel shaft 8 has positioned therein a transverse slot 47 through which the flat pawl 48 may freely reciprocate. A washer 49 fits over the outer end of the shaft 8 on which is threaded the nut 50.

The particular construction of the clutch block is more specifically shown in Fig. 10. This block 46 is provided with a plurality of ratchet shoulders 51 and cam surfaces 52 which cooperate with the reciprocating pawl 48. In the normal operation of the lawn mower this construction permits of a positive forward rotation of the cutter reel through the sprocket wheel 11 when the lawn mower moves in an advancing direction, while permitting the cutter reel to remain stationary when the lawn mower is moved in a rearward direction. It is well known that when grinding a lawn mower, it is necessary to reverse the rotation of the cutter reel. This is accomplished in my lawn mower by simply removing the block 46 from the pins 44, reversing the position of the pawl 48, turning the block 46 over and again positioning the same upon the pins 44. By this simple operation a reversal in the direction of rotation of the cutter reel can be obtained without in any way disturbing any of the driving mechanism of the lawn mower. It will thus be seen that the blades of the cutter reel can be ground when employing a device constructed in accordance with my invention without the necessity of dismantling the lawn mower by merely removing the block 46 at each end of the cutter reel shaft 8 and in replacing the same thereon with their opposite faces in contact with the driven sprocket wheels 11.

In order to prevent any accumulation of grass about the driving mechanism of the lawn mower it is to be noted that the housings 2 completely inclose the same, the only projecting elements being the ground wheels 9. The lower wall of the front section 5 of each housing extends back to a point adjacent the ground wheel 9 as more particularly shown in Fig. 2. The extreme rear end of each housing is completely closed, the opening for the ground wheel 9 being of less length than the diameter of the wheel. The arrangement is such that any loose grass which may be picked up by the ground wheel 9 will be prevented from being carried up into the housing by virtue of the curved structure of the rear wall of the housing as also more particularly shown in Fig. 2. The hinged closure plate 6 forms substantially the entire outer wall of the housing 2 and is so proportioned that all of the elements carried in the housing may be removed therefrom when the closure 6 is in open position. I provide a novel and effective means for maintaining the closure 6 in closed position and for preventing the same from rattling. This means comprises the hinged latch 53 illustrated in detail in Fig. 13. The latch 53 is adapted to extend beneath the lower wall of the housing 2 and be engaged by the cooperating spring latching clip 54 which extends through the opening 55 in the latch 53. The latch clip 54 is so tensioned that it normally urges the closure 6 against the transverse wall of the housing 2. The latch is released by pressing upon the latch clip 54 to permit its disengagement from the latch bar 53.

Due to the unevenness of the lawn or the presence of obstructions such as stones, sidewalks and the like it frequently becomes necessary to elevate the cutter reel above its normal cutting position. I have devised a practical and effective structure whereby this result may be accomplished which will now be described. The handle 56 is secured to the usual bar 57 in any conventional manner. The bar 57 has secured to its lower end the diverging arms 58 held in position on the bar 57 by the bolts 59. These diverging arms 58 are pivotally mounted upon the lugs 60 projecting from the housings 2 all as illustrated in Fig. 1. There is also secured to each housing 2 a stationary arcuate rack 61 as shown in Figs. 1, 3 and 14. Each of the arms 58 carries a pivoted pawl 62 for cooperating with the racks 61. The pawls 62 are normally held out of engagement with the racks 61 by the coil springs 63. Each pawl 62 is operatively connected through means of a suitable fastening member 64 to a cable 65. The cable 65 is looped at its central portion and trained between the pulleys 66 mounted in the bracket 67 carried on the upper side of the bar 57. This central loop of the cable 65 is connected to a rod 68 slidably mounted upon the bar 57. The upper end of the rod 68 carries a finger gripping member 69. A spring 70 mounted upon the rod 68 normally urges the same toward the bracket 67. When it is desired to elevate the cutter reel for the purpose of passing over an obstruction the operator of the lawn mower adjusts the handle 56 to the necessary height to secure the desired fulcruming of the cutter reel about the ground wheels. When the handle is in this position the operator exerts a slight pull upon the finger gripping member 69 to tighten the cable 65 and cause the pawls 62 to engage the racks 61 whereupon a depression upon the handle 56 will raise the cutter reel 1 about the ground wheels as a fulcrum thus enabling the elevation of the cutter reel when and as desired. Since the pawls 62 and all of the movable associated elements are carried by the handle mechanism, the handle may be swung about the lugs 60 to a position in advance of the lawn mower, the swinging movement of the handle in an advanced direction being limited by the contact of the arms 58 with the stops 71 secured to the housings 2 for this purpose.

From the foregoing it will be apparent that I have provided a lawn mower of comparatively simple construction which can be assembled with but few operations. The independent mountings for the ground wheels completely eliminate the usual transverse shaft and also permit of the independent adjustment of the driving mechanism at each side of the lawn mower while the improved clutching arrangement facilitates the grinding of the lawn mower.

It is to be understood that while I have been specific in the description of the various features of my invention such description is merely illustrative and that modifications of the specific structure described may be employed if within the scope of the appended claims.

What I claim as my invention is:

1. In a lawn mower of the class described, a pair of parallel longitudinally extending hollow housings having longitudinally coextensive inner and outer walls, a cutter reel mounted between and having bearings in the inner walls of said housings, a ground wheel releasably supported on the inner wall of each of said housings adjacent the rear end thereof, the inner walls of said housings being curved outwardly adjacent their forward ends to provide a clearance for the ends of the blades carried by said cutter reel whereby said ground wheels may follow in the path of said cutter reel.

2. A lawn mower of the class described, comprising a pair of parallel longitudinally extending hollow housings, a cutter reel carried by said housings, a ground wheel mounted in each of said housings, a stub axle for each ground wheel, means for securing said stub axles to the inner walls of said housings, said means being adjustable to secure relative movement of said stub axles longitudinally of said housings, and means for securing said ground wheels on said stub axles.

3. In a lawn mower of the class described, a cutter reel, ground wheels, means for driving said cutter reel from said ground wheels, a clutch member, said clutch member being detachably associated with said driving means and comprising a reversible ratchet block structure to normally secure in one position a forward motion of said cutter reel and reversible in position to secure a backward rotation of the cutter reel without disturbing said driving means.

4. A lawn mower comprising a frame, a pair of ground wheels mounted on said frame for independent longitudinal adjustment with respect to said frame, a cutter reel carried by said frame in advance of said ground wheels, power transmitting means for driving said cutter reel from said ground wheels, said power transmitting means including a pair of removable ratchet blocks reversible in position to secure either a forward or reverse rotation of said cutter reel.

5. In a lawn mower of the class described, a pair of longitudinally extending side members, a cutter reel having a shaft, bearings in said side members through which the ends of said cutter reel shaft extend, a pair of ground wheels carried by said side members, a driving sprocket wheel secured to each of said ground wheels, a driven sprocket wheel freely rotatable upon each end of said cutter reel shaft, sprocket chains for driving said driven sprocket wheels from said driving sprocket wheels, a reversible ratchet block associated with each of said driven sprocket wheels to normally secure in one position a forward rotation of said cutter reel and reversible in position to secure a backward rotation of the cutter reel.

6. In a lawn mower of the class described, a pair of ground wheels, a driving element secured to each of said ground wheels, a cutter reel having a shaft, a driven element mounted for free rotation upon each end of said shaft and operatively connected to the associated driving element, a removable and reversible ratchet block, associated with each of said driven elements to normally secure in one position a forward rotation of said cutter reel and reversible in position to secure a backward rotation of the cutter reel.

7. In a lawn mower of the class described, a pair of ground wheels, a driving sprocket wheel secured to each of said ground wheels, a cutter reel, a driven sprocket wheel rotatably mounted at each end of the cutter reel, sprocket chains for driving said driven sprocket wheels from said driving sprocket wheels, means for clutching said driven sprocket wheels to the cutter reel including a pair of reversible ratchet blocks releasably secured to said driven sprocket wheels, said blocks being adjustable to one position to secure a positive forward rotation of the cutter reel when the lawn mower is moved in an advancing direction while the cutter reel remains stationary when the lawn mower is moved in a rearward direction and adjustable to a second position to secure a reversal of this operation.

8. In combination with a lawn mower of the class described, a hollow housing adapted to inclose the ground wheel at one side of the lawn mower and the associated mechanism for driving a cutter reel therefrom, the inner wall of said housing being curved outwardly to provide a relatively narrow portion at one end of the housing, the difference in width between said narrow portion and the remaining portion of the housing being substantially the same as the width of the ground wheel inclosed in said housing, means for adjustably supporting the ground wheels on the inner wall of said housing, a substantial portion of the outer wall of said housing constituting a closure therefor whereby access may be had to the mechanism inclosed therein.

WILLIAM H. HAINES.